United States Patent
Casperson

(12)
(10) Patent No.: US 9,090,321 B1
(45) Date of Patent: Jul. 28, 2015

(54) PROPULSION SYSTEM FOR MULTIHULL WATERCRAFT

(71) Applicant: John R Casperson, Pensacola, FL (US)

(72) Inventor: John R Casperson, Pensacola, FL (US)

( * ) Notice: Subject to any disclaimer, the term of this patent is extended or adjusted under 35 U.S.C. 154(b) by 206 days.

(21) Appl. No.: 13/758,015

(22) Filed: Feb. 4, 2013

(51) Int. Cl.
| | |
|---|---|
| *B63B 1/00* | (2006.01) |
| *B63H 21/17* | (2006.01) |
| *B63H 5/08* | (2006.01) |
| *B63B 17/00* | (2006.01) |
| *B63H 20/02* | (2006.01) |
| *H02J 7/00* | (2006.01) |

(52) U.S. Cl.
CPC ........ *B63H 5/08* (2013.01); *B63B 17/00* (2013.01); *B63H 20/02* (2013.01); *B63H 21/17* (2013.01); *H02J 7/00* (2013.01)

(58) Field of Classification Search
CPC .......... B63H 5/08; B63H 20/02; B63H 21/17; B63B 17/00; H02J 7/00
USPC .................. 114/61.2, 61.24; 440/6, 67, 71, 72
See application file for complete search history.

(56) References Cited

U.S. PATENT DOCUMENTS

| | | | | |
|---|---|---|---|---|
| 3,139,058 A | * | 6/1964 | Robinson | 114/61.17 |
| 3,143,992 A | * | 8/1964 | Beams | 114/61.24 |
| 3,831,540 A | * | 8/1974 | Case | 114/77 R |
| 3,848,561 A | * | 11/1974 | Price | 440/69 |
| 4,223,620 A | * | 9/1980 | Dudouyt | 114/61.2 |
| 4,315,475 A | * | 2/1982 | Echols | 114/61.24 |
| 5,131,875 A | * | 7/1992 | Lee | 440/7 |
| 6,062,925 A | * | 5/2000 | Salmi et al. | 440/67 |
| 7,047,902 B1 | * | 5/2006 | Little | 114/361 |
| 7,070,468 B2 | * | 7/2006 | Schmidt | 440/79 |
| 7,267,589 B2 | * | 9/2007 | Norman | 440/67 |
| 2005/0268833 A1 | * | 12/2005 | Conrad | 114/55.5 |
| 2007/0232159 A1 | * | 10/2007 | Lee | 440/53 |

OTHER PUBLICATIONS

O.B. Yaakob, A. Nasirudin, M.p. Abdul Ghani, T. Mat Lazim, M.A. Abd Mukti, Y.M. Ahmed, "Parametric study of a low wake-wash inland waterways catamaran" Apr. 9, 2012, Scientai Iranica B (2012) 19 (3), 463-471.*

* cited by examiner

*Primary Examiner* — S. Joseph Morano
*Assistant Examiner* — Anthony Wiest
(74) *Attorney, Agent, or Firm* — John R. Casperson

(57) ABSTRACT

One embodiment of the invention provides a multihull watercraft having outermost hulls, a length, and a pair of propulsion units positioned inboard of its outermost hulls in a central ½ of the watercraft length. The propulsion units include propellers which are positioned to engage the water within the central ½ of the watercraft length and draft less than the outermost hulls. Because the outermost hulls provide protection from obstacles, the propulsion units can be operated propeller-end first, at a sufficiently high efficiency so that solar power for electric motors becomes an economically viable power source.

13 Claims, 3 Drawing Sheets

PROPULSION SYSTEM FOR MULTIHULL WATERCRAFT

FIELD OF THE INVENTION

This invention relates to a propulsion system for watercraft, and is expected to be especially useful for multihull vessels having displacement hulls.

BACKGROUND OF THE INVENTION

Efforts have been made to position propulsion units at the sterns of multihull vessels, such as catamarans and trimarans.

For lightweight hulls, such as those employed in beach catamarans, however, there is inadequate floatation and height above the waterline at this location to protect the propulsion unit from splashing or immersion, particularly if the operator is near the back of the boat. Additionally, excess weight at the back of the boat tends to immerse the transoms when underway, which produces much drag for a displacement hull. A technique for protecting the propulsion units from water would be desirable, as well as a technique powering a lightweight powered catamaran that makes headway without immersing the transoms.

A further consideration relating to positioning the propulsion units at the stern is the necessity of positioning the props deeply enough in the water so that they do not come out of the water during ordinary wave action, cavitate, or aspirate. A technique for running the propulsion units very shallow, which would reduce drag, and thus increase speed and efficiency, and reduce the possibility of striking an underwater object, and further not lose efficiency by coming out of the water, cavitating, or aspirating, would be very desirable.

An additional consideration with stern mounted propulsion units is the provision of the steering mechanism, which presents a tripping hazard and attack point for corrosion, power sources, such as batteries or fuel tanks, which affect the trim of the vessel and present a tripping hazard, and lines such as fuel lines and/or battery cables, running from the power sources to the propulsion units, which present a tripping hazard, and in the case of battery cables, waste energy. A technique which minimizes tripping hazards, does not affect vessel trim, and keeps fuel lines, control lines, and battery cables short, would be very desirable.

A power boat capable of being launched from the beach would be very desirable.

A boat capable of running on solar-electric power would be very desirable.

SUMMARY OF THE INVENTION

One embodiment of the invention provides a multihull watercraft having outermost hulls, a length, and a pair of propulsion units positioned inboard of its outermost hulls in a central ½ of the watercraft length. The propulsion units include propellers which are positioned to engage the water within the central ½ of the watercraft length and draft less than the outermost hulls.

Where the propulsion units are electric trolling motors having cylindrical downshafts extending into the water, drag is reduced by surrounding the downshafts with a fairing. In accord with another embodiment of the invention, the fairing is provided in the form of a pair of complementary, non-identical fairing pieces formed from a continuous matrix of a tough plastic which are adhesively mounting on a downshaft of diameter D. The fairing, when assembled on the downshaft, has a generally teardrop cross-sectional shape with a nose and a tail, a maximum width W, and a length L which is measured between the nose and tail. W is positioned at about ⅓ L from the nose and the fairing is transversely penetrated top to bottom by a borehole of diameter D centrally located on W. W is no more than about ¼ inch larger than D, and the fairing has been split into two portions along W through a thin sidewall at that location to form a fairing nose-piece and a fairing tail-piece for adhesively mounting to the shaft.

Another embodiment of the invention provides an electric trolling motor having a propeller shroud mounted thereon. The trolling motor has a downshaft for mounting a motor casing to a boat, the motor casing being positioned at a right angle to the downshaft and housing a motor, and a skeg extending downwardly from the motor casing away from the downshaft. A propeller shaft extends axially from the motor housing, and a propeller is mounted to the propeller shaft. The shroud is generally tubularly shaped, having an inlet end and an outlet end and is mounted to the trolling motor skeg and downshaft at the outlet end of the shroud. The propeller is positioned within the shroud between the inlet end and the outlet end. An inside converging section of the shroud is positioned at the inlet end of the shroud for accelerating water to the propeller, and a conical outer surface converging toward the outlet end of the shroud and providing additional thrust for the trolling motor when the propeller rotates for propelling the unit propeller end first. The motor casing is positioned coaxially in the outlet end of the shroud.

Another embodiment of the invention provides an electric trolling motor which is set up for propeller-forward operation. The trolling motor has a downshaft for mounting a motor casing to a boat. The motor casing positioned at a right angle to the downshaft and houses a motor. A propeller shaft extends axially from the motor housing, and a propeller is mounted to the propeller shaft. The blades of the propeller have an airfoil-shaped cross-section, each blade having a convex side and a relatively flat side. The convex side of each blade face away from the motor.

DETAILED DESCRIPTION OF THE INVENTION

A catamaran or trimaran can be skid-steered by two widely spaced propulsion units positioned amidships, inboard of the outermost hulls. The only controls necessary are those which provide the ability to control propulsion unit speed and the direction of propeller rotation. The propulsion units are positioned to provide thrust parallel to the boat axis, and are preferably fixed in such position. Because the need to control motor tilt and direction is eliminated, the conventional trolling motor mounting brackets can be totally eliminated and the downshafts secured to the deck or hatches in the deck by collars or the like to save weight.

Figure 1:
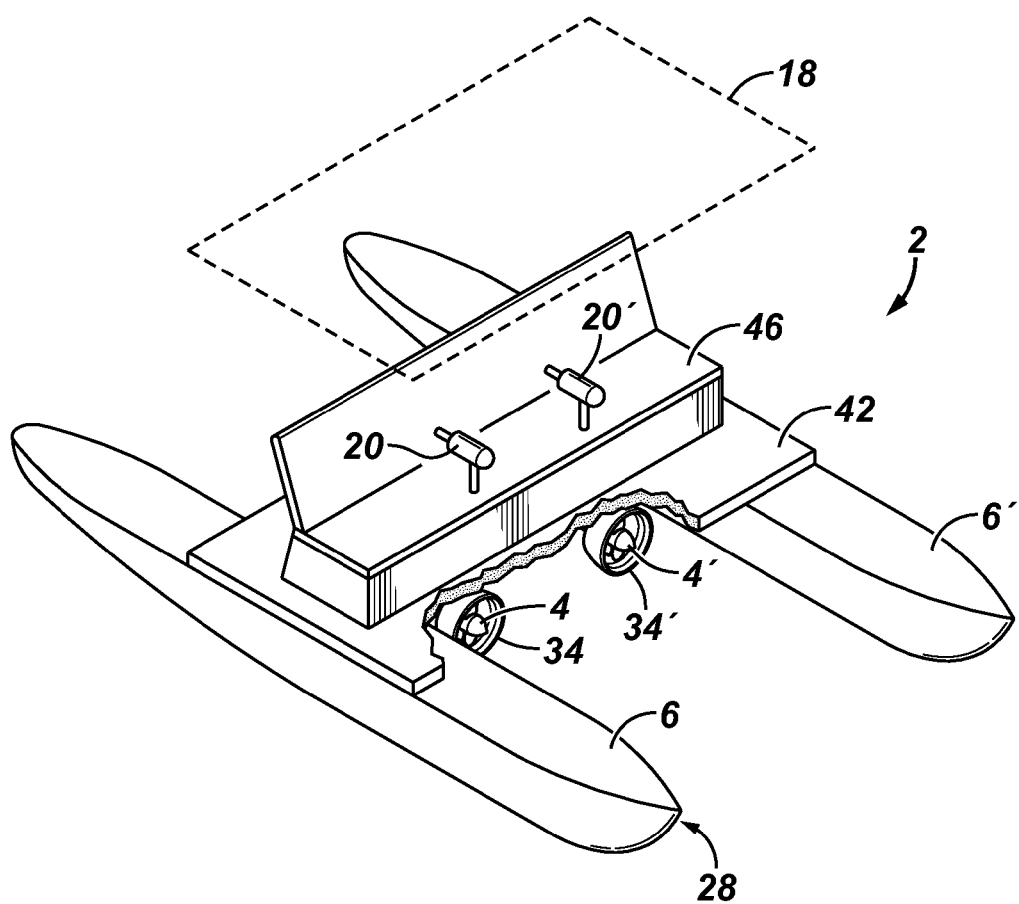
FIG. 1 pictorially illustrates certain features of the invention. Certain parts are illustrated in dashed lines or broken away to illustrate features beneath.
Figure 2:
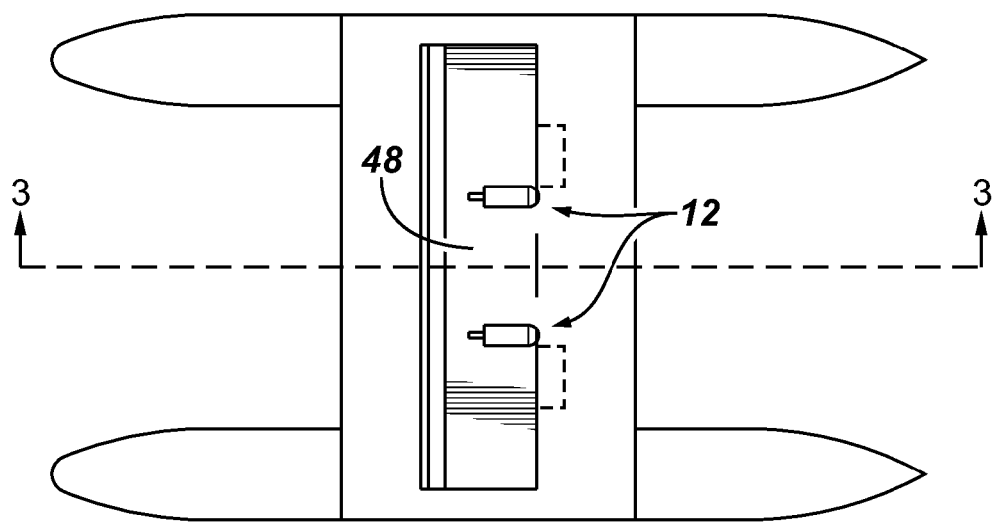
FIG. 2 is a plan view of the embodiment of the invention shown in FIG. 1.
Figure 3:
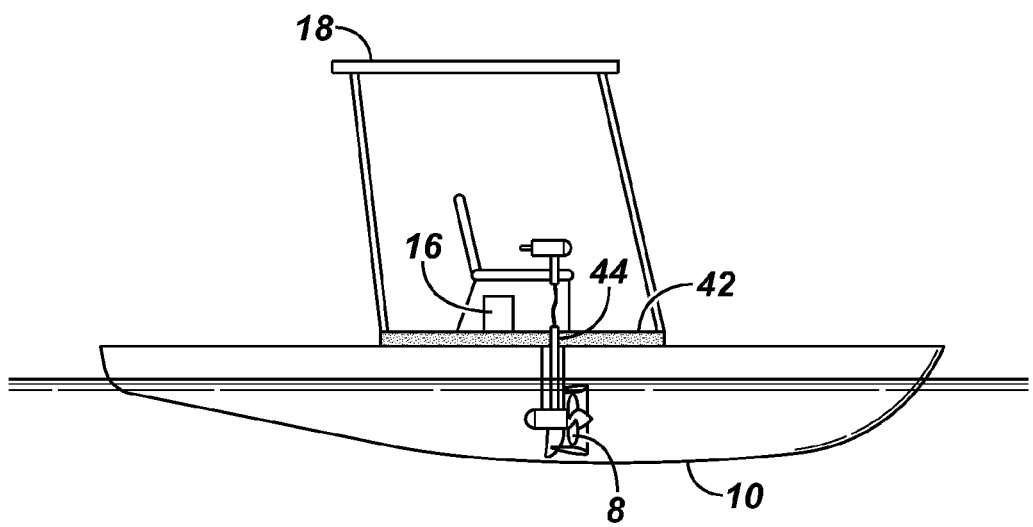
FIG. 3 is a cross sectional view of the invention shown in FIG. 2, taken along lines 3-3.
Figure 4:
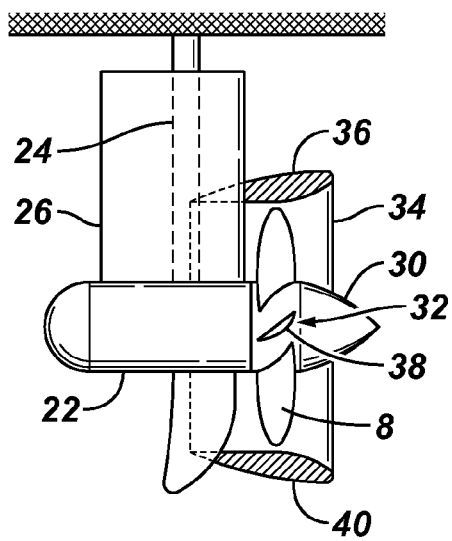
FIG. 4 is a detailed view of a propulsion unit shown in FIG. 3.
Figure 5:
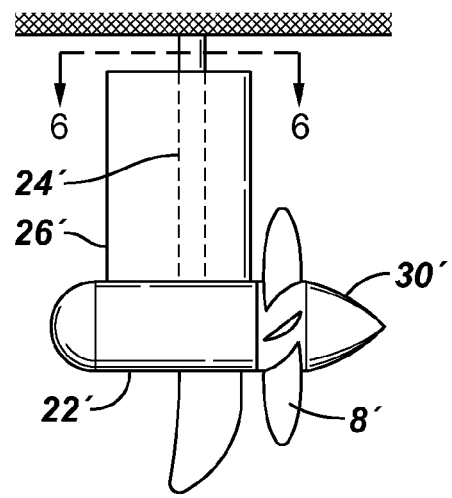
FIG. 5 is a detailed view of an alternative propulsion unit to that of FIG. 4.
Figure 6:
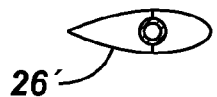
FIG. 6 is a view of a downshaft fairing taken along lines 6-6 of FIG. 5.
Figure 7:
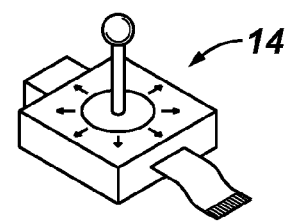
FIG. 7 is a pictorial illustration of a joy-stick controller that can be used alternatively to the controllers shown in FIG. 1.

The amidships position of the propulsion units facilitates "skid steering" the boat, particularly in a cross wind, as compared to stern mounted units. The ability to turn the propulsion units is not needed, nor is a rudder nor the means for controlling it. However, in the embodiment of the invention shown in FIG. 8, a rudder may be needed, and a back up rudder in any event is desirable in the event of a single motor failure. By using electric motors, the boat can be controlled by wires between the control(s) and the motors, see FIGS. 2 and 3, and by positioning the controls and batteries when used as described herein, the wires can be kept very short. Internal combustion engines can be controlled by cables. The provision of two propulsion units in the boat provides redundancy, and is desirable for that reason as well.

Because the draft of the boat is relatively stable amidships, the propellers can be run very shallow, which increases efficiency by drag reduction, and permits lightweight boats to be run up on the beach, provided that the propulsion units are operated so that the propellers rotate above the level of the keel or the propulsion units are provided with a means for "kicking back" when the vessel is beached. When the vessel is provided with a shroud or nozzle as described herein, the propeller can actually be run with its top edge rotating above the waterline surrounding the nozzle, as the nozzle becomes full of water at a very low speed, a water bulge forming in front it when underway. Also, the tendency of the propellers to aspirate or cavitate due to movements of the vessel as it is affected by waves or movements of the occupants is reduced. Besides using a nozzle, propeller draft can be reduced by using a smaller diameter propeller, optionally with higher forward pitch and/or with more than two blades.

By positioning the head of the engines or the electronics for the electric motors under a cover or closed in seating bench, they can be protected from spray, an important consideration for use in salt water. The bench also provides sound insulation, which is important for IC propulsion units. A bench mounted amidships also provides a seating area which doesn't upset the trim of the boat, and provides a location for battery or fuel tank storage which doesn't present a tripping hazard. For a solar powered boat, the panel(s) can be mounted directly over the bench, to provide shade for the users of the boat. The controls for the propulsion units can be mounted for use by an operator seated near a central position on the bench, to keep the length of the wires or control cables very short.

The inventive technique is best suited for displacement type hulls, preferably catamarans. For efficiency and the use of low power propulsion units, top speed for lightweight catamaran hulls is limited to about ½ of hull speed for long skinny hulls, (HS (knots)=2.44 (LWL(ft))½, approximately). Half of hull speed in long skinny lightweight displacement hulls can generally be approached with about 0.5 horsepower for each 400 pounds displacement, per hull.

As an example, a 16 foot, 800 pound loaded displacement-hull catamaran could be expected, using the guideline noted above, to reach a top speed of about 5.3 mph at 0.5 horsepower per hull (375 watts) which can be provided by a pair of inexpensive "30 pound thrust" electric trolling motors. The same rig is calculated by another formula to cruise at 4.1 mph at about half power, which could be provided by a pair of "30 pound thrust" trolling motors drawing a total of 30 amps at 12 volts. The low power draw makes solar recharging of the batteries economically feasible.

As another example, a 36 foot, 3200 pound loaded displacement-hull catamaran could be expected, using the guideline noted above to reach a top speed of about 8 mph at about 2 horsepower per hull, which can be provided using IC or electric motors. A top speed of 11 mph is estimated from about 8.5 horsepower per hull, which could be provided by a pair of 10 HP IC propulsion units, for example. The two propulsion units together can be estimated to consume less than 2 gph of gasoline at such output.

An existing sailing catamaran can be adapted for use as described herein by mounting a transverse deck over the front crossover beam, or in place of the front crossover beam, and providing holes or cutouts mounting the propulsion units through the deck. The embodiment illustrated in the drawings is an adaptation of a beach type sailing catamaran. Prindle (R) 16 ft sailing catamaran hulls have been used for testing aspects of the invention. The batteries or gas tanks can be positioned between the propulsion units, and a bench seat positioned in covering relationship with the propulsion units and batteries or gas tank(s) to cut down on deck clutter and protect them from spray. A portion or more of the existing deck, for example, the trampoline, can be retained if desired for a back deck, not shown.

To recharge the batteries from a 3 hour 30-amp cruise in 6 hours of bright summer Florida sunlight, with horizontal photovoltaic collectors, would require about 250 watts of panels for the 16 foot boat given in the example above. Alternatively, it should be noted that bright sunlight with panels sized as above will increase cruise time and distance by about 50%, or alternatively, result in operation during hours of bright summer sun at very low, if any battery drain, at low cruise speeds, on the order of 3 mph.

With reference to the drawings, a multihull watercraft 2 is shown having a pair of propulsion units such as electric motors 4, 4' or IC engines units positioned inboard of its outermost hulls 6, 6' in a central ½ of the watercraft length. The propulsion units are provided with propellers 8, 8' which are positioned to engage the water also within the central ½ of the vessel length and preferably draft less than the outermost hulls. In other words, the propellers preferably operate in a volume of water defined between the hulls, the water surface, and the hull keels 10, at near the middle of the vessel, although, as noted above, the water surface can be locally raised inside of the nozzle when used. Preferably, the propulsion units are outboards and are positioned in the central ⅓ of the vessel length, preferably within the central ⅕ of the vessel length. By "outboard" is meant a propulsion unit having a vertically positioned downshaft or housing attached to the craft and extending into the water with a propeller shaft positioned at a right angle from the downshaft or housing and the power unit positioned on one end of the housing or shaft for movement therewith.

The pair of propulsion units permits the craft to be "skid steered". Because of this, it is unnecessary to make provision for turning the propulsive direction of the propulsion units while underway, other than to provide for forward and reverse. Turns are executed by providing more power to one motor than the other, or by operating one motor in forward and the other in reverse. The craft is simply provided with means 12 for controlling each propulsion unit speed and direction of rotation, to provide means to steer the craft. The means 12 can be selected from lever-type marine engine controls (not shown), twist-throttle type controls such as a pair of speed/direction controller assemblies 20, 20' compatible with the motors and operatively coupled electrically to the motors, see FIG. 3 for example, or a 4 or preferably 8-position joystick direction controller 14 with speed control of the type used on motorized wheelchairs. For DC electric motors, the controller is preferably provides for pulse-width-modulation (PWM) for infinite variation in the speed control of the motors and efficiency. For use around water, the DC voltage is preferably kept beneath 48 volts, such as 12, 24 or 36 V. Further in the case of electric motors, the craft comprises one or more batteries 16 for supplying power to the motors via the motor controller means and switches, fuses, charge controllers, etc. not shown but within the skill of the art. Lead-acid batteries are preferred for economy. Light weight batteries such as LiFePO4 are preferred for performance. Long-life batteries such as NiFe-alkaline are preferred for durability and low toxicity.

In one embodiment, the craft further comprises at least one solar electric panel 18 for recharging the at least one battery from the sun. The at least one panel can be mounted on a tower in covering relationship with the bench, to provide shade for the craft occupants. For economy, the panel can be sized to provide in the range of 8% to 80% of the maximum current draw of the combined motors, preferably in the range of 15% to 40% of the maximum current draw, with the upper limited being imposed by the rate at which the battery(s) can be charged without significant damage.

In a particularly preferred embodiment, the multihull craft is propelled by a pair of electric motors each positioned in a horizontally oriented motor housing 22, 22' which runs submerged and is coupled to the craft by a vertically extending motor housing shaft 24, 24'. Each of the electric motors has a propeller shaft on which a propeller is mounted. The propeller operates in a water volume defined between the waterline and the keel and provides a longitudinally directed driving force for the vessel. More preferably, the motor housing shaft is surrounded by a streamlined fairing 26, 26', for example a symmetrical fairing such as a NACA 0021. Even more preferably, the propeller is mounted between the motor and the bow end 28 of the vessel, so that the propeller pulls the boat along. In this case, the nose of the fairing will be oriented in the direction of the propeller. Proceeding propeller-first eliminates air aspiration into the propeller from behind the motor housing shaft, since the motor housing shaft is now behind the propeller. As a consequence, the propeller can be run very near the surface without significant aspiration, which reduces drag while maintaining propeller efficiency.

In one embodiment of the invention, the fairing is assembled onto the shaft as a nose piece and a tail piece. For this application, the fairing is described as a pair of complementary, non-identical fairing pieces formed from a continuous matrix of a tough plastic for adhesively mounting on a shaft of diameter D. The fairing, when assembled, has a generally teardrop cross-sectional shape with a nose and a tail, with a maximum width W and length L. L is measured between the nose and tail, and W is positioned at ⅓ L from the nose. The fairing has a transverse penetration top to bottom by a borehole of diameter D centrally located on W. W is no more than about ¼ inch larger than D, and the fairing has been split into two portions along W through a thin sidewall at that location to form the pair of non-identical fairing pieces for adhesively mounting to the shaft. A boxcutter can be used to make the split, for example. Epoxy resin can be used to glue the pieces to the shaft. Marine decking material, which is wood particles in a continuous polyvinylchloride matrix, can be used for the fairing. A NACA 0021 fairing sized to provide a W of 1¼ inches has been used with good results on a 1 inch shaft.

Even more preferably, a spinner 30, 30' is mounted on the propeller shaft between the motor and the bow end of the vessel. The spinner preferably has a maximum cross section near that of the motor casing diameter, to provide low drag. In a prototype, a 10"×6" APC model airplane propeller with two blades was tested in conjunction with a plastic 3" propeller spinner for a model airplane on a Motor Guide(R) T-34 trolling motor with promising results.

In the propeller-first configuration, the propeller blades have an airfoil cross section 32 to provide thrust toward a bow end of the vessel, The propeller blades each have a convex surface 38 facing generally away from the motor. In conventional electric motors and engines for marine use, it is opposite, with the convex surface facing the gearcase or electric motor casing, so that the propeller is protected by the propulsion unit casing. In the invention, propeller protection is afforded by the hulls. The craft will run aground prior the impact of the bottom by the propellers.

In one embodiment of the invention, the propeller is surrounded by a tubular shroud or nozzle 34, 34' positioned coaxially with respect to the propeller shaft and having an airfoil shaped longitudinal cross section 36 to provide thrust toward the bow end of the vessel when the propeller is rotated. The transverse section of the shroud is annular. A portion of the shroud including the inlet end is positioned between the motor and the bow end of the vessel. The shroud, when viewed in longitudinal section, has a generally conical, preferably convex annular exterior surface 40 facing back toward a stern end of the craft. Water flowing through the shroud accelerates to faster than the surrounding water, creating a pressure difference between the inside and the outside of the shroud. This causes the outside water to try to crush the surface 40, causing the shroud to "squirt" forward and provide additional forward thrust.

The shroud is well adapted for mounting to an electric trolling motor having a downshaft which mounts the motor casing to a boat. The motor casing is positioned at a right angle to the downshaft and houses a motor. A skeg extends downwardly from the motor casing away from the downshaft. A propeller shaft extends axially from the motor housing. The propeller is mounted to the propeller shaft. The shroud is generally tubularly shaped and has an inlet end and an outlet end. It is mounted to the trolling motor skeg and downshaft at the outlet end of the shroud. This is preferably accomplished by notching the outlet end of the shroud to fit the skeg and the downshaft, and lashing the shroud to these structures, such as with nylon ties. Lateral stability is preferably further provided by notching the downshaft fairing to receive the shroud, and gluing the shroud to the fairing, such as with epoxy adhesive. An inside converging section of the shroud is positioned at the inlet end of the shroud for accelerating water to the propeller, which forces the water through an annulus defined between an outer surface of the motor casing and a generally cylindrical inside surface of the shroud adjacent the outlet end of the shroud. The outlet end portion of the shroud has conical outer surface converging toward the outlet end of the shroud providing additional thrust for the trolling motor when proceeding in a propeller first orientation.

The multihull craft includes a rigid deck 42 which connects the hulls amidships. In a catamaran, the hulls are parallel and the deck extends transversely normally between them. The propulsion units are preferably outboards mounted to the upper side of the deck and have vertical midsections 44 which extend through the deck or hatches in the deck through holes or cutouts.

A seating bench 46 is positioned over the top of the pair of propulsion units, and the at least one fuel container or battery is situated beneath the bench, preferably between the propulsion units. The motor controls are positioned within reach of a seated operator of the craft, preferably in a middle section 48 of the bench.

A further embodiment of the invention provides a electric trolling motor that is set up for propeller-forward operation. The trolling motor has a downshaft for mounting a motor casing to a boat. The motor casing positioned at a right angle to the downshaft and is for housing a motor. A propeller shaft extends axially from the motor housing. A propeller is mounted to the propeller shaft. The blades of the propeller each have an airfoil-shaped cross-section, each blade having a convex side and a relatively flat side. The convex sides of the blades face away from the motor. Performance of the trolling motor will be further improved by mounting a spinner on the propeller shaft, said spinner having a big end of about the same diameter as the motor casing and a pointed end pointing away from the motor, and providing a fairing on the trolling motor downshaft, said fairing having a teardrop-shaped cross section with a nose end and a tail end and being positioned on the downshaft with the nose end facing the direction of the propeller.

In a preferred embodiment of the invention, the each hull of the catamaran watercraft has a length WL as measured between the bow and the stern at the waterline and the pair of parallel hulls is separated beneath the waterline by a distance WK as measured between the keels. WL is generally between 1 and 4 times WK, for the full length of the hulls, so that water flow between the hulls is substantially unimpeded by the hulls from the bow to the stern. For recreational watercraft, WL will generally range from 3 to 30 meters, usually from 4 to 15 meters. WK will generally range from 0.75 meters to 7.5 meters, usually from 1 to 3.75 meters. The generally flat sides of the hulls preferably also extend for the full length of the hull. The motors preferably are positioned near the hulls so that the propellers or nozzles generally come within about 0.3 meters, preferably 0.2 meters, more preferably about 0.1 meters, of the hull.

Figure 8:
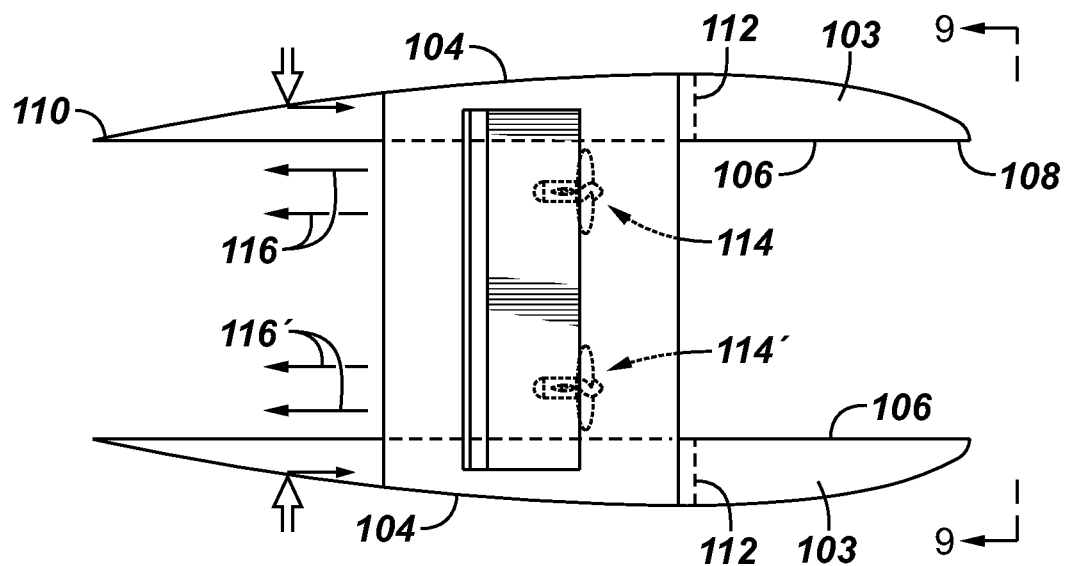
FIG. 8 is a pictorial top side view of a catamaran watercraft according to another embodiment of the invention.
Figure 9:
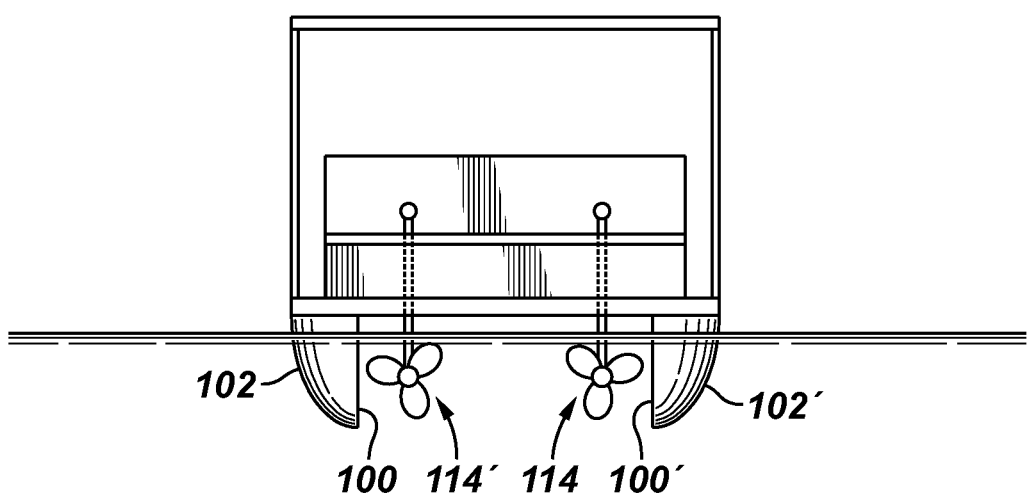
FIG. 9 is a pictorial front end view of the catamaran watercraft shown in FIG. 8.

With reference to FIGS. 8 and 9, in a further preferred embodiment, each hull has a relatively flat outer surface 100, 100' facing inwardly, toward a centerline of the catamaran watercraft, and a curved outer surface 102, 102' facing outwardly, away from the centerline of the catamaran watercraft. Each hull has an asymmetrical foil shape 103 when viewed in cross section beneath the waterline in a plane parallel to the surface of the water. The shapes of the pair of hulls are mirror images of each other. Using airfoil terminology, each foil shape is described as having a curved upper surface 104 and a relatively flat lower surface 106, a leading edge 108 oriented toward the bow end of the catamaran watercraft, a trailing edge 110 oriented toward the stern end of the catamaran watercraft, and a maximum thickness 112 which is located in a central half of the vessel length. The foil shape can be sharpened at the leading edge, to provide for improved wave penetration, and truncated at the trailing edge, to provide improved distribution of buoyancy, if desired. The positioned of the bridge between the hulls can also be adjusted longitudinally to improve buoyancy.

For small craft, the maximum thickness of the foil shape is generally located from ⅓ to ½ of the distance to the trailing edge from the leading edge of the foil. The propulsion units are preferably positioned between or near the maximum thicknesses of the hulls. For larger craft (above 10 m) it may be desirable to position the maximum thickness further aft. The maximum thickness of the foil at the waterline is generally in the range of 5 percent to 15 percent of the length of the foil. Preferably, a maximum draft of the catamaran watercraft is within a central ½ of the vessel length, each hull has a single keel, and the keel of each hull follows a curve from the waterline near the bow end to the waterline at the stern, and each keel lies in a plane perpendicular to the waterline. See FIG. 3. Successively deeper cross sectional views of each hull beneath the waterline in parallel planes have generally similar foil-shaped cross sections down to the keel, diminishing in area as depth increases.

To provide a dynamic effect, the pair of widely laterally spaced propulsion units 114, 114' are operated to generate low pressure alongside an aft portion of the generally inwardly facing relatively flat surfaces of the hulls. This is accomplished by producing streams or water 116, 116' inboard of the hulls flowing sternward at a faster rate than water flowing along the outside of the hulls. When that occurs, relatively higher water pressure acting against a rearwardly converging aft portion of the curved generally outwardly facing surfaces of the hulls provides a forward thrust component for the catamaran watercraft. See the arrows in FIG. 8.

This dynamic effect is felt, at slow watercraft speeds, as higher thrust, and at higher watercraft speeds, as lower hull drag. In other words, the craft will pull harder at slow speeds, go faster at maximum speed, and move with higher efficiency at medium speeds, than similar catamarans with symmetric hulls, or catamarans with asymmetric foil shaped hulls positioned with curved upper surfaces facing each other, or catamarans having hulls positioned in the above manner but not being operated to produce low pressure against the rearward flat surfaces of the hulls as described. The effect would be undetectable in drag tests without the propulsion units operating as described.

The pair of widely laterally spaced propulsion units is preferably operated with slippage to produce streams of water which are moving with respect to surrounding water. The streams of water flow toward the stern of the catamaran watercraft adjacent to the relatively flat, inwardly facing surfaces of the hulls. The water pressure acting against the aft portions of the curved outwardly facing surfaces of the hulls acts to reduce the drag of the hulls through the water. The causes the watercraft to proceed with speed greater than what would be predicted based on the power of the propulsion units.

The method of the invention comprises operating the pair of widely laterally spaced propulsion units with slippage to produce a stream of water which is moving with respect to surrounding water. The water stream is flowed toward the stern of the catamaran adjacent to the relatively flat, inwardly facing surfaces of the hulls adequately to produce a pressure difference across the hulls from outside to inside and a forward propelling force acting on the outer surface of the hulls.

To produce the slippage, the propeller is preferably optimized as is known in the art by adjusting parameters such as number of blades, diameter, pitch, and blade size and shape. A nozzled arrangement as described herein is also suitable. If the watercraft is difficult to skid steer because of opposing forces, a rudder can be added in a conventional way. Or, in an embodiment not illustrated, the hulls can be switched and the propulsion units operated outboard of the hulls to neutralize the forces opposing skid steering.

While certain preferred embodiments of the invention have been described herein, the invention is not to be construed as being so limited, except to the extent that such limitations are found in the claims.

What is claimed is:

1. A catamaran watercraft having a bow end, a stern end, and a length measured between the bow end and the stern end, said catamaran watercraft comprising a pair of parallel hulls, each having a single keel, a rigid deck connecting the pair of parallel hulls amidships, and a pair of widely laterally spaced propulsion units positioned by the deck at a location near the hulls within a central ⅓ of the watercraft length, each said propulsion unit including a screw propeller which is positioned to engage the water within the central ⅓ of the watercraft length and draft less than the pair of hulls, the screw propellers of the pair of propulsion units operating in a volume of water defined between the pair of parallel hulls, the water surface, and the keels of the pair of parallel hulls, wherein each hull has a length WL as measured between the bow and the stern at the waterline and the pair of parallel hulls are separated beneath the waterline by a distance WK as measured between the keels, wherein WL is between 1 and 4 times WK, for the full length of the hulls, so that water flow between the hulls is substantially unimpeded by the hulls from the bow to the stern, wherein each hull has a relatively flat outer surface facing inwardly, toward a centerline of the catamaran watercraft, and a curved outer surface facing outwardly, away from the centerline of the catamaran watercraft, each hull having an asymmetrical foil shape when viewed in cross section beneath the waterline in a plane parallel to the surface of the water, said foil shape described as having a curved upper surface facing outwardly and a relatively flat lower surface facing inwardly, a leading edge oriented toward the bow end of the catamaran watercraft, a trailing edge oriented toward the stern end of the catamaran watercraft, and a maximum thickness which is located in a central half of the vessel length; and wherein the maximum thickness of the foil shape is located from ⅓ to ½ of the distance to trailing edge from the leading edge of the foil, wherein the maximum thickness of the foil at the waterline is in the range of 5 percent to 15 percent of the length of the foil, and a maximum draft of the catamaran watercraft is within a central ⅓ of the vessel length, wherein each hull has a single keel, the keel of each hull following a curve from the waterline near the bow end to the waterline at the stern, wherein successively deeper cross sectional views of each hull beneath the waterline in parallel planes have similar foil-shaped cross sections down to the keel.

2. A catamaran watercraft as in claim 1 wherein the pair of propulsion units comprise a pair of electric motors each positioned in a horizontally oriented motor housing which runs submerged and is coupled to the deck by a vertically extending motor housing downshaft, each said electric motor having a propeller shaft on which said screw propeller is mounted and providing a longitudinally directed driving force for the catamaran watercraft.

3. A catamaran watercraft as in claim 2 wherein each motor housing downshaft is surrounded by a streamlined fairing.

4. A catamaran watercraft as in claim 3 wherein each screw propeller is mounted between the electric motor and the bow end of the vessel.

5. A catamaran watercraft as in claim 4 wherein a spinner is mounted on each propeller shaft between the electric motor and the bow end of the vessel.

6. A catamaran watercraft as in claim 5 wherein each propeller has a plurality of blades, each blade of said plurality of blades having an airfoil cross section to provide thrust toward the bow end, each blade of said plurality of blades having a convex surface facing generally away from the motor.

7. A catamaran watercraft as in claim 6 wherein each propeller is surrounded by a shroud positioned coaxially with respect to the propeller shaft and having an airfoil shaped longitudinal cross section to provide thrust toward the bow end when the propeller is rotated, said shroud being positioned generally between the motor and the bow end, said shroud having a generally conical exterior surface facing back toward the stern end.

8. A catamaran watercraft as in claim 7 wherein each of the electric motor housings has a skeg extending downwardly from the motor housing and each of the shrouds is generally tubularly shaped, having an inlet end and an outlet end and is mounted to said skeg and said downshaft at the outlet end of the shroud, the propeller being positioned within the shroud between the inlet end and the outlet end, an inside converging section of the shroud being positioned at the inlet end of the shroud for accelerating water to the propeller, and the conical exterior surface of the shroud converging toward the outlet end of the shroud and providing additional thrust for the motor when the propeller rotates.

9. A catamaran watercraft as in claim 3 where each streamlined fairing comprises a pair of complementary, non-identical fairing pieces formed from a continuous plastic matrix adhesively mounted in assembled form on the motor housing downshaft, said fairing having a generally teardrop cross-sectional shape with a nose and a tail, with a maximum width W and length L, L being measured between the nose and tail, with W being positioned at ⅓ L from the nose, said fairing having been transversely penetrated top to bottom by a borehole of diameter D centrally located on W, the borehole receiving the motor housing downshaft, wherein W is no more than about ¼ inch larger than D, the fairing having been split into two portions along W through a thin sidewall at that location to form a fairing nose-piece and a fairing tailpiece adhesively mounted to the motor housing downshaft.

10. A catamaran watercraft as in claim 1 wherein the propulsion units are outboards mounted to the upper side of the deck and have vertical midsections which extend through the deck or hatches in the deck through holes or cutouts located near amidships.

11. A catamaran watercraft as in claim 10 further comprising a seating bench positioned over the top of the pair of propulsion units, and at least one fuel container or battery situated between the propulsion units.

12. A catamaran watercraft as in claim 11 wherein at least one battery is positioned beneath the bench, said craft further comprising at least one solar panel positioned over and spaced apart from the bench, for recharging the at least one battery.

13. A method of operating the catamaran watercraft according to claim 1, said method comprising operating the pair of widely laterally spaced propulsion units with adequate slippage to produce two streams of water that are moving with respect to surrounding water, each stream flowing toward the stern of the catamaran adjacent to the relatively flat, inwardly facing surface of one of the hulls, one stream per hull, to produce a pressure difference across the hulls from outside to inside and a forward propelling force acting on the outer surface of the hulls.

* * * * *